(12) United States Patent
McKinstry et al.

(10) Patent No.: US 8,828,480 B2
(45) Date of Patent: Sep. 9, 2014

(54) MICROCONTACT PRINTED THIN FILM CAPACITORS

(71) Applicant: The Penn State Research Foundation, University Park, PA (US)

(72) Inventors: Susan Trolier McKinstry, State College, PA (US); Clive A. Randall, State College, PA (US); Hajime Nagata, Chiba (JP); Pascal G. Pinceloup, Albuquerque, NM (US); James J. Baeson, Simpsonville, SC (US); Daniel J. Skamser, Ham Lake, MN (US); Michael S. Randall, Simpsonville, SC (US); Azizuddin Tajuddin, Laurens, SC (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 13/795,179

(22) Filed: Mar. 12, 2013

(65) Prior Publication Data

US 2013/0337153 A1 Dec. 19, 2013

Related U.S. Application Data

(62) Division of application No. 11/262,524, filed on Oct. 28, 2005, now Pat. No. 8,414,962.

(51) Int. Cl.
*B05D 5/12* (2006.01)

(52) U.S. Cl.
USPC ............. 427/97.3; 427/58; 427/79; 427/98.4; 101/327; 101/483; 101/492

(58) Field of Classification Search
CPC ...................... B81C 1/0046; B81C 2201/0185; H01G 4/1227; H01G 4/33; H01G 4/306; B22D 13/00; B29C 39/08

USPC ............ 427/58, 79, 97.3, 98.4; 101/327, 483, 101/492

See application file for complete search history.

(56) References Cited

U.S. PATENT DOCUMENTS

| | | |
|---|---|---|
| 3,976,922 A | 8/1976 | Peck |
| 3,984,592 A | 10/1976 | Stillwagon |
| 4,037,069 A | 7/1977 | Gonzalez et al. |
| 4,054,937 A | 10/1977 | Mandelcorn et al. |
| 4,065,851 A | 1/1978 | Kumer |
| 4,097,912 A | 6/1978 | Lapp |

(Continued)

OTHER PUBLICATIONS

Cheng et al, Chemical Solution Deposition of Columnar-Grained Metallic Lantanum Nitrate Thin Films, J. Am. Cer. Soc., pp. 1786-1788, 2003.

(Continued)

*Primary Examiner* — Nathan Empie
*Assistant Examiner* — Xiao Zhao
(74) *Attorney, Agent, or Firm* — Law Offices of John A. Parrish

(57) ABSTRACT

The invention relates to thin film single layers, electronic components such as multilayer capacitors which utilize thin film layers, and to their methods of manufacture. Chemical solution deposition and microcontact printing of dielectric and electrode layers are disclosed. High permittivity BaTiO3 multilayer thin film capacitors are prepared on Ni foil substrates by microcontact printing and by chemical solution deposition. Multilayer capacitors with BaTiO3 dielectric layers and LaNiO3 internal electrodes are prepared, enabling dielectric layer thicknesses of 1 µµm or less. Microcontact printing of precursor solutions of the dielectric and electrode layers is used.

21 Claims, 5 Drawing Sheets

(56) References Cited

U.S. PATENT DOCUMENTS

| | | |
|---|---|---|
| 4,097,913 A | 6/1978 | Lapp |
| 4,108,068 A | 8/1978 | Lambert |
| 4,117,260 A | 9/1978 | Wilkenloh |
| 4,117,437 A | 9/1978 | Ottesen |
| 4,166,285 A | 8/1979 | Bauer |
| 4,178,012 A | 12/1979 | Roth |
| 4,182,660 A | 1/1980 | Zimmer |
| 4,230,013 A | 10/1980 | Wellings |
| 4,266,624 A | 5/1981 | Nordstron |
| 4,273,043 A | 6/1981 | Martino |
| 4,320,034 A | 3/1982 | Lapp |
| 4,346,429 A | 8/1982 | DeMatos |
| 4,352,078 A | 9/1982 | Moore |
| 4,352,147 A | 9/1982 | Elias |
| 4,355,346 A | 10/1982 | Gauger et al. |
| 4,363,162 A | 12/1982 | Pricey |
| 4,378,619 A | 4/1983 | Billeriss |
| 4,383,386 A | 5/1983 | Giordano |
| 4,417,298 A | 11/1983 | Nakata |
| 4,423,956 A | 1/1984 | Gordon |
| 4,460,901 A | 7/1984 | Tricoles |
| 4,464,700 A | 8/1984 | Stenerhag |
| 4,480,285 A | 10/1984 | Grahame |
| 4,586,112 A | 4/1986 | MacDougall |
| 4,603,373 A | 7/1986 | Lavene |
| 4,612,455 A | 9/1986 | Weiner |
| 4,669,468 A | 6/1987 | Cartmell |
| 4,680,423 A | 7/1987 | Bennett |
| 4,687,540 A | 8/1987 | Singhdeo |
| 4,709,754 A | 12/1987 | Chu |
| 4,719,414 A | 1/1988 | Miller |
| 4,744,000 A | 5/1988 | Mason |
| 4,762,067 A | 8/1988 | Barker |
| 4,764,181 A | 8/1988 | Nakano |
| 4,804,917 A | 2/1989 | Miller |
| 4,816,614 A | 3/1989 | Baigrie |
| 4,891,733 A | 1/1990 | Mammone |
| 4,912,595 A | 3/1990 | Tanaka |
| 4,933,706 A | 6/1990 | Abumehdi |
| 4,940,867 A | 7/1990 | Peleg |
| 4,947,287 A | 8/1990 | Hoppe |
| 4,963,891 A | 10/1990 | Aoyagi |
| 4,970,495 A | 11/1990 | Matsumoto |
| 4,980,262 A | 12/1990 | Thomas |
| 4,985,288 A | 1/1991 | Matsumoto |
| 4,997,517 A | 3/1991 | Parthasarathi |
| 5,046,423 A | 9/1991 | Paisley |
| 5,098,781 A | 3/1992 | Minnick |
| 5,119,070 A | 6/1992 | Matsumoto |
| 5,142,351 A | 8/1992 | Matta |
| 5,153,986 A | 10/1992 | Brauer |
| 5,164,689 A | 11/1992 | Plonka |
| 5,181,770 A | 1/1993 | Brock |
| 5,223,120 A | 6/1993 | Kojima |
| 5,230,712 A | 7/1993 | Matthews |
| 5,276,410 A | 1/1994 | Fukuzawa |
| 5,305,178 A | 4/1994 | Binder |
| 5,313,216 A | 5/1994 | Wang |
| 5,317,339 A | 5/1994 | Braun |
| 5,319,392 A | 6/1994 | Durst |
| 5,359,487 A | 10/1994 | Carrico |
| 5,371,650 A | 12/1994 | Lavene |
| 5,380,341 A | 1/1995 | Matthews |
| 5,394,295 A | 2/1995 | Galvagni |
| 5,455,336 A | 10/1995 | Vianen |
| 5,493,471 A | 2/1996 | Walther |
| 5,506,740 A | 4/1996 | Harmon |
| 5,592,087 A | 1/1997 | Richard |
| 5,600,610 A | 2/1997 | Hill |
| 5,620,087 A | 4/1997 | Martin |
| 5,636,100 A | 6/1997 | Zheng |
| 5,667,417 A | 9/1997 | Stevenson |
| 5,677,049 A | 10/1997 | Torii |
| 5,693,206 A | 12/1997 | Castegnier |
| 5,718,719 A | 2/1998 | Clare |
| 5,745,438 A | 4/1998 | Hill |
| 5,761,801 A | 6/1998 | Geabhardt |
| 5,800,724 A | 9/1998 | Habeger |
| 5,808,412 A | 9/1998 | Zovko |
| 5,811,664 A | 9/1998 | Whittington |
| 5,822,178 A | 10/1998 | Constanti |
| 5,822,856 A | 10/1998 | Bhatt |
| 5,863,402 A | 1/1999 | Castegnier |
| 5,928,767 A | 7/1999 | Gebhardt |
| 5,937,758 A | 8/1999 | Maracas |
| 5,947,027 A | 9/1999 | Burgin |
| 5,949,637 A | 9/1999 | Iwaida |
| 5,993,945 A | 11/1999 | Russell |
| 6,000,129 A | 12/1999 | Bhatt |
| 6,004,419 A | 12/1999 | Torii |
| 6,009,619 A | 1/2000 | Lauffer |
| 6,022,670 A | 2/2000 | Russell |
| 6,036,099 A | 3/2000 | Leighton |
| 6,060,256 A | 5/2000 | Everhart |
| 6,127,025 A | 10/2000 | Bhatt |
| 6,180,288 B1 | 1/2001 | Everhart |
| 6,185,091 B1 | 2/2001 | Tanahashi |
| 6,207,522 B1 | 3/2001 | Hunt |
| 6,210,553 B1 | 4/2001 | Castegnier |
| 6,212,057 B1 | 4/2001 | Kohara |
| 6,239,965 B1 | 5/2001 | Shiraishi |
| 6,254,971 B1 | 7/2001 | Katayose |
| 6,268,016 B1 | 7/2001 | Bhatt |
| 6,270,835 B1 | 8/2001 | Hunt |
| 6,287,673 B1 | 9/2001 | Katsir |
| 6,310,765 B1 | 10/2001 | Tanahashi |
| 6,313,747 B2 | 11/2001 | Imaichi |
| 6,329,226 B1 | 12/2001 | Jones |
| 6,346,335 B1 | 2/2002 | Chen |
| 6,356,245 B2 | 3/2002 | Metzen |
| 6,367,332 B1 | 4/2002 | Fisher |
| 6,369,334 B1 | 4/2002 | Lauffer |
| 6,383,616 B1 | 5/2002 | Uchibore |
| 6,388,230 B1 | 5/2002 | Nacker |
| 6,399,295 B1 | 6/2002 | Kaylor |
| 6,400,554 B1 | 6/2002 | Shiraishi |
| 6,413,282 B1 | 7/2002 | Tanahashi |
| 6,420,093 B1 | 7/2002 | Ohba |
| 6,433,359 B1 | 8/2002 | Kelley |
| 6,433,393 B1 | 8/2002 | Narita |
| 6,436,651 B1 | 8/2002 | Everhart |
| 6,436,803 B2 | 8/2002 | Bhatt |
| 6,472,955 B2 | 10/2002 | Saito |
| 6,473,293 B2 | 10/2002 | Shimada |
| 6,485,833 B1 | 11/2002 | Imashiro |
| 6,493,206 B1 | 12/2002 | King |
| 6,514,367 B1 | 2/2003 | Leighton |
| 6,518,168 B1 | 2/2003 | Clem |
| 6,522,527 B2 | 2/2003 | Kojima |
| 6,525,921 B1 | 2/2003 | Nakatani |
| 6,569,543 B2 | 5/2003 | Brenneman |
| 6,576,026 B1 | 6/2003 | Shiraishi |
| 6,576,524 B1 | 6/2003 | Evans |
| 6,607,413 B2 | 8/2003 | Stevenson |
| 6,617,609 B2 | 9/2003 | Kelley |
| 6,667,215 B2 | 12/2003 | Theiss |
| 6,670,101 B2 | 12/2003 | Ohba |
| 6,689,268 B2 | 2/2004 | Chen |
| 6,698,085 B2 | 3/2004 | Stevenson |
| 6,707,660 B1 | 3/2004 | Evans |
| 6,728,092 B2 | 4/2004 | Hunt |
| 6,736,985 B1 | 5/2004 | Bao et al. |
| 6,739,689 B2 | 5/2004 | Choi |
| 6,753,612 B2 | 6/2004 | Adae-Amoakoh |
| 6,764,712 B2 | 7/2004 | Katsir |
| 6,765,784 B2 | 7/2004 | Ohya |
| 6,768,132 B2 | 7/2004 | Smith |
| 6,795,299 B2 | 9/2004 | Naito |
| 6,806,520 B2 | 10/2004 | Theiss |
| 6,817,293 B2 | 11/2004 | Fujihira |
| 6,828,939 B2 | 12/2004 | Li |
| 6,864,396 B2 | 3/2005 | Smith |
| 6,866,791 B1 | 3/2005 | Breen |
| 6,870,180 B2 | 3/2005 | Dodabalapur |

(56) References Cited

U.S. PATENT DOCUMENTS

| | | |
|---|---|---|
| 6,872,468 B1 | 3/2005 | Dean |
| 6,872,893 B2 | 3/2005 | Fukuoka |
| 6,895,645 B2 | 5/2005 | Xu |
| 6,897,544 B2 | 5/2005 | Ooi |
| 2001/0003438 A1 | 6/2001 | Imaichi |
| 2001/0004176 A1 | 6/2001 | Perdue |
| 2001/0006735 A1 | 7/2001 | Katsir |
| 2001/0015884 A1 | 8/2001 | Takeshima |
| 2001/0027922 A1 | 10/2001 | Chen |
| 2001/0043132 A1 | 11/2001 | Saito |
| 2001/0051442 A1 | 12/2001 | Katsir |
| 2002/0000932 A1 | 1/2002 | Metzen |
| 2002/0025416 A1 | 2/2002 | Uchibori |
| 2002/0037593 A1 | 3/2002 | Craighead |
| 2002/0097550 A1 | 7/2002 | Shimada |
| 2002/0102459 A1 | 8/2002 | Hosoya |
| 2002/0102494 A1 | 8/2002 | Ohba |
| 2002/0102495 A1 | 8/2002 | Ohba |
| 2002/0106516 A1 | 8/2002 | Sato |
| 2002/0123158 A1 | 9/2002 | Murai |
| 2002/0132898 A1 | 9/2002 | Takaya |
| 2002/0145203 A1 | 10/2002 | Adae-Amoakoh |
| 2002/0145845 A1 | 10/2002 | Hunt |
| 2002/0179329 A1 | 12/2002 | Fukuoka |
| 2003/0003837 A1 | 1/2003 | Stevenson |
| 2003/0007318 A1 | 1/2003 | Kojima |
| 2003/0010241 A1 | 1/2003 | Fujihira |
| 2003/0011960 A1 | 1/2003 | Koning |
| 2003/0024666 A1 | 2/2003 | Suzuki |
| 2003/0041443 A1 | 3/2003 | Stevenson |
| 2003/0047535 A1 | 3/2003 | Schueller |
| 2003/0053286 A1 | 3/2003 | Masuda |
| 2003/0071878 A1 | 4/2003 | Murai |
| 2003/0075270 A1 | 4/2003 | Landi |
| 2003/0090550 A1 | 5/2003 | Murai |
| 2003/0090860 A1 | 5/2003 | Naito |
| 2003/0092203 A1 | 5/2003 | Murai |
| 2003/0102472 A1 | 6/2003 | Kelley |
| 2003/0116348 A1 | 6/2003 | Nakatani |
| 2003/0123158 A1 | 7/2003 | Wright |
| 2003/0127187 A1 | 7/2003 | Rapuano |
| 2003/0133283 A1 | 7/2003 | Belhoff |
| 2003/0133869 A1 | 7/2003 | Hur |
| 2003/0148024 A1 | 8/2003 | Kodas |
| 2003/0156376 A1 | 8/2003 | Nitoh |
| 2003/0156402 A1 | 8/2003 | Ding |
| 2003/0162386 A1 | 8/2003 | Ogawa |
| 2003/0166796 A1 | 9/2003 | Imaizumi |
| 2003/0169561 A1 | 9/2003 | Ohya |
| 2003/0175411 A1 | 9/2003 | Kodas |
| 2003/0175551 A1 | 9/2003 | Smith |
| 2003/0200301 A1 | 10/2003 | Trzcinko |
| 2003/0211649 A1 | 11/2003 | Hirai |
| 2003/0213382 A1 | 11/2003 | Kendale |
| 2003/0218649 A1 | 11/2003 | Choi |
| 2003/0222379 A1 | 12/2003 | Baik |
| 2004/0046167 A1 | 3/2004 | McCoy |
| 2004/0066608 A1 | 4/2004 | Takagi |
| 2004/0075609 A1 | 4/2004 | Li |
| 2004/0099960 A1 | 5/2004 | Adae-Amoakoh |
| 2004/0101696 A1 | 5/2004 | Yamazaki |
| 2004/0104451 A1 | 6/2004 | Ooi |
| 2004/0105218 A1 | 6/2004 | Masuda |
| 2004/0112881 A1 | 6/2004 | Bloemeke |
| 2004/0118600 A1 | 6/2004 | Lee |
| 2004/0147640 A1 | 7/2004 | Hwang |
| 2004/0159462 A1 | 8/2004 | Chung |
| 2004/0160729 A1 | 8/2004 | Kochi |
| 2004/0161593 A1 | 8/2004 | Yamazaki |
| 2004/0163758 A1 | 8/2004 | Kagan |
| 2004/0168312 A1 | 9/2004 | Wu |
| 2004/0171214 A1 | 9/2004 | Koike |
| 2004/0173823 A1 | 9/2004 | Murai |
| 2004/0175582 A1 | 9/2004 | Brenneman |
| 2004/0175585 A1 | 9/2004 | Zou |
| 2004/0179329 A1 | 9/2004 | Iwaida |
| 2004/0180225 A1 | 9/2004 | Brenneman |
| 2004/0180988 A1 | 9/2004 | Bernius |
| 2004/0183645 A1 | 9/2004 | Takaya |
| 2004/0186821 A1 | 9/2004 | Matson |
| 2004/0188682 A1 | 9/2004 | Hirai |
| 2004/0191560 A1 | 9/2004 | Matsuda |
| 2004/0206448 A1 | 10/2004 | Dubrow |
| 2004/0207496 A1 | 10/2004 | Lee |
| 2004/0207973 A1 | 10/2004 | Naito |
| 2004/0245519 A1 | 12/2004 | Van De Walle |
| 2004/0250849 A1 | 12/2004 | Chen |
| 2004/0253473 A1 | 12/2004 | Weekes |
| 2004/0264111 A1 | 12/2004 | Shimoyama |
| 2005/0011817 A1 | 1/2005 | Fuchigami |
| 2005/0011857 A1 | 1/2005 | Borland |
| 2005/0012099 A1 | 1/2005 | Couillard et al. |
| 2005/0019592 A1 | 1/2005 | Bai |
| 2005/0029515 A1 | 2/2005 | Nagai |
| 2005/0030696 A1 | 2/2005 | Ouchi |
| 2005/0035333 A1 | 2/2005 | Gerlach |
| 2005/0037213 A1 | 2/2005 | Kihara |
| 2005/0038498 A1 | 2/2005 | Dubrow |
| 2005/0051870 A1 | 3/2005 | Yamazaki |
| 2005/0057136 A1 | 3/2005 | Morlya |
| 2005/0057884 A1 | 3/2005 | Yamada |
| 2005/0070043 A1 | 3/2005 | Yamakawa et al. |
| 2005/0074627 A1 | 4/2005 | Ichiyanagi |
| 2005/0078433 A1 | 4/2005 | Ichiyanagi |
| 2005/0093107 A1 | 5/2005 | Bao |
| 2005/0097716 A1 | 5/2005 | Takakuwa |
| 2005/0101714 A1 | 5/2005 | Yamasaki |
| 2005/0128680 A1 | 6/2005 | Shin et al. |
| 2005/0130422 A1 | 6/2005 | Theiss |
| 2005/0239218 A1 | 10/2005 | Aggarwal |

OTHER PUBLICATIONS

Meng et al, Growth of (100) Oriented LaNiO3 Thin Films Directly on Si Substrates by simple metallorganic decompositioin technique for the highly oriented PZT thin films, J. Crystal Growth, pp. 100-104, 2000.

Thickness profile of LNO/BTO/LNO structure

Profile of the LN-BTO-LNO/SiO$_2$/Si structure

MICROCONTACT PRINTED THIN FILM CAPACITORS

FIELD OF THE INVENTION

The invention relates to multilayer capacitors and methods for their manufacture.

BACKGROUND OF THE INVENTION

The capacitor has substantially shrunk in recent history. Currently, tape casting and related technologies are utilized for the manufacture of multilayer capacitors. There is interest in exploring thin film approaches to creating multilayer capacitors. Ceramic dielectric thin films are commonly formed by a broad range of deposition techniques, such as chemical solution deposition (CSD), evaporation, sputtering, physical vapor deposition and chemical vapor deposition. In order to achieve the requisite dielectric structure, each technique typically requires either a high-temperature deposition or a high-temperature anneal.

Prior art methods of forming a specific structure such as a dielectric that has patterned micron or sub-micron features include irradiative lithographic methods such as photolithography, electron-beam lithography, and x-ray lithography.

Photolithography entails forming a negative or positive resist (photoresist) onto the exposed surface of a substrate. The resist is irradiated in a predetermined pattern, and irradiated (positive resist) or non irradiated (negative resist) portions of the resist are washed from the surface to produce a predetermined pattern of resist on the surface of the substrate. This is followed by one or more procedures. An example of such a procedure entails use of the resist as a mask in an etching process in which areas of the material not covered by resist are chemically removed, followed by removal of resist to expose a predetermined pattern of the conducting, insulating, or semiconducting material on the substrate.

Tape casting also has been used to form features which are micron sized in thickness, but which require an additional technique to enable lateral patterning of the electrodes. Tape-casting enables the formation of layers which have a thickness of 0.8 μm. It is uncertain, however, as to whether tape casting can achieve films which have thicknesses of less than 0.2 μm. Electrode patterns are typically created, at present, by screen printing on the electrode ink. This process typically produces comparatively rough edges on the electrodes, which is one factor that leads to the comparatively large margins that are required in typical multilayer capacitors.

Although irradiative lithographic methods may be advantageous for patterning the electrode (and potentially the dielectric) in many circumstances, these methods require sophisticated and expensive apparatus to reproduce a particular pattern on a plurality of substrates. Additionally, they generally consume more reactants and produce more by-products. Further, they are relatively time-consuming.

A need exists for methods of fabrication of thin films useful in devices such as multilayer capacitors (MLC) which avoid the disadvantages of the prior art methods.

SUMMARY OF THE INVENTION

Figure 1:
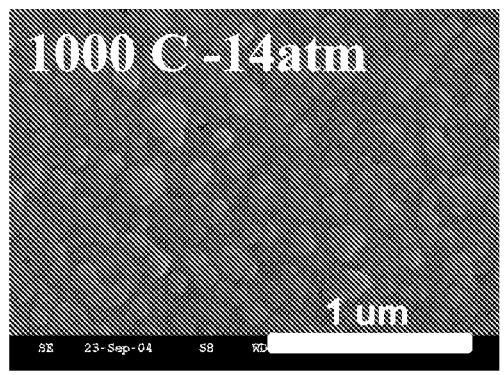
FIG. 1 (a) shows the microstructure of the top surface of a $BaTiO_3$ film heat treated at 1000° C. in $10^{-14}$ atm $O_2$

In a first aspect, a method of forming a microcontact printed layer of a material having barium titanate therein, such as any of stoichiometric barium titanate and doped barium titanate such as $(Ba_{1-y}M'_y)(Ti_{1-x}M''_x)O_3$ that where M" is any of Mn, Y, Ho, Dy, Mg, Er, Ca, Co or mixtures thereof, or Zr, preferably Mn then $0.005 \leq x \leq 0.3$, preferably x=0.005 to 0.015 with the proviso that when M" is Zr then x=0.02 to 0.2, preferably 0.05 to 0.1; and when M' is any of Sr, Ca, Y, Ho, Dy, Er or Mg then $0.005 \leq y \leq 0.3$ with a first proviso that when M' is any of Y, Ho, Dy or Er then preferably $0.005 \leq y \leq 0.05$, and with a second proviso that when M' is Sr, then preferably $0.06 \leq y \leq 0.2$ and with a third proviso that when M' is Ca, then preferably $0.005 \leq y \leq 0.1$ and with a fourth proviso that when M' is Mg then y=0.005 to 0.1, preferably 0.005 to 0.05, and with a fifth proviso that y may be zero when M" is Mn on to a substrate such as Ni foil, Cu foil, sapphire, alumina, cordierite, or cordierite containing glass-ceramics or alumina containing glass-ceramics, and $Si/SiO_2$ is disclosed. The substrate may ultimately be removable. The method entails forming a precursor solution suitable for producing a material having barium titanate therein and applying the precursor solution onto a micro stamp that has a predetermined pattern thereon to form a coated micro stamp. The coated micro-stamp is compressed onto the substrate to form a pattern of the precursor solution on the substrate. The pattern is dried, pyrolyzed and fired to produce a micro contact printed layer of a material having barium titanate on the substrate. If Ni foil is used as the substrate, it may be any of annealed Ni foil, virgin Ni foil and 99.99% pure Ni foil.

In a second aspect, a method of manufacture of a multilayer capacitor by microcontact printing is disclosed. The method entails forming a precursor solution of an electrode such as $LaNiO_3$ and applying the precursor solution onto a micro stamp having a predetermined pattern to form a coated micro stamp. The stamp is compressed onto a substrate such as any of a $SiO_2/Si$, alumina, cordierite, or cordierite or alumina containing glass-ceramics, Cu foil or Ni foil to form a pattern of the precursor solution of the electrode on the substrate. The pattern is heat treated to produce a crystallized pattern of electrode on the substrate. A precursor solution of a dielectric material is applied onto a micro stamp and compressed onto the electrode pattern to form a pattern of dielectric precursor solution on the patterned electrode. A micro stamp having a dielectric precursor solution thereon then is compressed onto the patterned electrode to form a multilayer monolith that is heat treated to crystallize the dielectric. A third stamping is used to produce the top electrode to make a capacitor. If desired, additional electrode and dielectric layers can be processed in the same way to make a multilayer capacitor.

In a third aspect, a method of manufacture of a multilayer capacitor is disclosed which comprises forming a precursor solution of a dielectric material such as stoichiometric barium titanate and doped barium titanate such as $(Ba_{1-y}M'_y)(Ti_{1-x}M''_x)O_3$ that where M'' is any of Mn, Y, Ho, Dy, Mg, Er, Ca, Co or mixtures thereof, or Zr, preferably Mn then $0.005 \le x \le 0.3$, preferably $x=0.005$ to $0.015$ with the proviso that when M'' is Zr then $x=0.02$ to $0.2$, preferably $0.05$ to $0.1$; and when M' is any of Sr, Ca, Y, Ho, Dy, Er or Mg then $0.005 \le y \le 0.3$ with a first proviso that when M' is any of Y, Ho, Dy or Er then preferably $0.005 \le y \le 0.05$, and with a second proviso that when M' is Sr, then preferably $0.06 \le y \le 0.2$ and with a third proviso that when M' is Ca, then preferably $0.005 \le y \le 0.1$ and with a fourth proviso that when M' is Mg then $y=0.005$ to $0.1$, preferably $0.005$ to $0.05$, and with a fifth proviso that y may be zero when M'' is Mn on to a substrate such as Ni foil, Cu foil, sapphire, alumina, AlN, cordierite, or cordierite containing glass-ceramics or alumina containing glass-ceramics, and $Si/SiO_2$ is disclosed. The substrate may ultimately be removable. The precursor solution of dielectric is spin cast onto a substrate such as any of a sapphire single crystal or Ni foil. The substrate having the precursor solution of dielectric thereon is heat treated to produce crystallized dielectric and an electrode material such as $LaNiO_3$ is spin cast onto the crystallized dielectric and heat treated to produce a multilayer capacitor.

In another aspect, a method of manufacture of a multilayer capacitor is disclosed which entails forming a precursor solution of an electrode material such as $LaNiO_3$. The precursor solution of the electrode material is coated onto a micro stamp and compressed onto a $SiO_2/Si$ substrate to produce a patterned layer of electrode precursor solution. The patterned layer is heat treated to produce a patterned electrode. A precursor solution of dielectric such as stoichiometric barium titanate and doped barium titanate such as $(Ba_{1-y}M'_y)(Ti_{1-x}M''_x)O_3$ that where M'' is any of Mn, Y, Ho, Dy, Mg, Er, Ca, Co or mixtures thereof, or Zr, preferably Mn then $0.005 \le x \le 0.3$, preferably $x=0.005$ to $0.015$ with the proviso that when M'' is Zr then $x=0.02$ to $0.2$, preferably $0.05$ to $0.1$; and when M' is any of Sr, Ca, Y, Ho, Dy, Er or Mg then $0.005 \le y \le 0.3$ with a first proviso that when M' is any of Y, Ho, Dy or Er then preferably $0.005 \le y \le 0.05$, and with a second proviso that when M' is Sr, then preferably $0.06 \le y \le 0.2$ and with a third proviso that when M' is Ca, then preferably $0.005 \le y \le 0.1$ and with a fourth proviso that when M' is Mg then $y=0.005$ to $0.1$, preferably $0.005$ to $0.05$, and with a fifth proviso that y may be zero when M'' is Mn is spin cast onto the patterned electrode. The precursor solution of dielectric is heat treated to produce crystallized dielectric. A layer of the electrode precursor solution coated onto a micro stamp and compressed onto the crystallized dielectric to form a patterned layer of electrode precursor solution on the crystallized dielectric, and then heat treated to produce a multilayer capacitor.

Having summarized the invention, the invention is described in further detail below by reference to the following detailed description.

DETAILED DESCRIPTION OF THE INVENTION

A method is disclosed for the manufacture of patterned materials at high resolution. The invention is useful for manufacture of electronic devices such as multilayer capacitors, varistors, and the like. Although the invention is described below with reference to the fabrication of multilayer capacitors, it should be understood that multilayer capacitors is exemplary only and that the invention may be employed to fabricate other electronic devices where patterned layers of material are employed.

Dielectric Materials

Various dielectric materials may be utilized. These dielectric materials include but are not limited to stoichiometric $BaTiO_3$, doped $BaTiO_3$ of the formula $Ba(Ti_{1-x}M_x)O_3$ where M is any of Mn, Y, Ho, Dy, Er, Mg, Ca, Co or mixtures thereof, preferably Mn, and $0.005 \le x \le 0.02$, preferably $x \le 0.01$ and doped barium titanate such as $(Ba_{1-y}M'_y)(Ti_{1-x}M''_x)O_3$ that where M'' is any of Mn, Y, Ho, Dy, Mg, Er, Ca, Co or mixtures thereof, or Zr, preferably Mn then $0.005 \le x \le 0.3$, preferably $x=0.005$ to $0.015$ with the proviso that when M'' is Zr then $x=0.02$ to $0.2$, preferably $0.05$ to $0.1$; and when M' is any of Sr, Ca, Y, Ho, Dy, Er or Mg then $0.005 \le y \le 0.3$ with a first proviso that when M' is any of Y, Ho, Dy or Er then preferably $0.005 \le y \le 0.05$, and with a second proviso that when M' is Sr, then preferably $0.06 \le y \le 0.2$ and with a third proviso that when M' is Ca, then preferably $0.005 \le y \le 0.1$ and with a fourth proviso that when M' is Mg then $y=0.005$ to $0.1$, preferably $0.005$ to $0.05$, and with a fifth proviso that y may be zero when M'' is Mn also may be used.

The dielectric materials may be prepared from precursor solutions thereof. Stoichiometric $BaTiO_3$ is prepared by forming a blend of a Ba precursor solution and a Ti precursor solution. Ba precursor solutions may be prepared by dissolving barium acetate in glacial acetic acid to produce a blend. The blend is stirred at elevated temperature, preferably about 90° C., to form a Ba precursor solution. The molarity of the solution is about 0.5 to about 1.5 M/l, preferably about 0.85 M barium acetate per liter.

Ti precursor solution may be formed by mixing a Ti isopropoxide with acetyl acetone. The molarity of this solution is about 1 to 10 M/l, preferably about 5 M Ti isopropoxide per liter acetyl acetone. The Ti precursor solution may be combined with the Ba precursor solution to produce a $BaTiO_3$ precursor solution that has a Ba:Ti of about 1.00. The $BaTiO_3$ precursor solution is stirred at elevated temperature such as for 1 hr at 90° C.

The $BaTiO_3$ precursor solution then may be diluted with an alkanol such as any of methanol, ethanol and 2-methoxyethanol or mixtures thereof, preferably methanol. Preferably, the $BaTiO_3$ precursor solution is diluted with methanol to a molarity of about 0.01 M to about 0.8 M, preferably about 0.1 M to about 0.3 M. The diluted $BaTiO_3$ precursor solution then is agitated until no strias are apparent as determined visually.

Doped $BaTiO_3$ precursor solutions for preparation of $(Ba_{1-y}M'_y)(Ti_{1-x}M''_x)O_3$ where M' and M'' are dopants also may be employed. Doped $BaTiO_3$ precursor solutions may be prepared by blending an M precursor solution such as a solution of M acetate in acetic acid with a precursor solution of Ba such as Ba acetate in acetic acid as described above. The resulting blend of solutions is mixed with Ti isopropoxide. For example, Mn doped $BaTiO_3$ precursor solution for preparation of $Ba(Ti_{1-x}Mn_x)O_3$ may be prepared by adding Mn acetate to the Ba precursor solution, and then reacting the resulting solution with Ti isopropoxide.

Suspensions of dielectric materials such as $BaTiO_3$ and doped $BaTiO_3$ or mixtures thereof. Microcontact printing of a suspension of $BaTiO_3$ in any combination of an alcohol, aliphatic or cyclic hydrocarbon or aqueous medium combined with additives suitable to create a film forming base such as, but not limited to, polyvinyl butyral, polyvinyl alcohol or the like, having an inorganic solids loading from 10 to 70 wt % and with additives levels from 1 wt % to 20 w %, comprised of $BaTiO_3$ of particle size ranging from 10 nm to 500 nm.

Electrode Materials

Various electrode materials may be employed. These include but are not limited to metallically conducting ruthanates, nickelates, cobaltates, and manganates, as well as metals such as Ag, Ag—Pd alloys, Ni, Cu, Pd, Pt and alloys thereof. The electrode materials are prepared from precursor solutions thereof. One example of a solution-based electrode solution is $LaNiO_3$.

$LaNiO_3$ precursor solutions may be prepared from water-based solutions and from alkoxy alkanol based solutions such as 2-methoxyethanol-based $LaNiO_3$ solutions. Water based $LaNiO_3$ solutions may be prepared by mixing reagent grade $(La(NO_3)_3 6H_2O$ and $(Ni(CH_3COO)_2 4H_2O)$ in a molar ratio of lanthanum/nickel of 1:1, and then dissolving into purified acetic acid at room temperature while stirring. The concentration of the solutions is adjusted to 0.3M and 0.5 M by adding purified acetic acid. The 2-methoxyethanol-based $LaNiO_3$ solutions may be prepared by dissolving $(La(NO_3)_3 6H_2O$ in 2-methoxyethanol and then adding monoethanolamine and $(Ni(CH_3COO)_2 4H_2O)$ in this sequence. The La/Ni molar ratio is fixed at 1.0.

Suspensions of electrode materials such as Ni also may be used. Generally, these are suspensions of an electrode material such as Ni in any conducting matrix, such as metallically conducting ruthenates, nickelates, cobaltates, and manganates, as well as metals such as Ni, Cu, Pd, Pt and alloys thereof. Typically, the electrode materials have a particle size range of about 10 nm to about 500 nm, more typically about 10 nm to about 100 nm and a solids content of about 10 to about 70 wt. % based on total weight of the suspension.

Substrates

Various substrate materials may be employed. These substrate materials include but are not limited to Ni substrates such as virgin Ni foil, annealed Ni foil, and Ni film on polyesters such as Mylar®, $SiO_2$/Si, cordierite, cordierite containing glass-ceramics, alumina containing glass-ceramics, sapphire single crystals, AlN, Cu foil and polycrystalline ceramic oxide substrates such as alumina, preferably Ni foil, more preferably 99.99% pure Ni foil. Substrates such as $SiO_2$/Si may be obtained from Nova Electronics Materials Co., sapphire single crystals may be obtained from Commercial Crystal Labs Co., and 99.99% pure Ni foil may be obtained from Alfa Aeser Co.

Annealed Ni foils which may be used as substrates include those which have been thermally annealed. The Ni films may be annealed at about 800° C. to about 1000° C., preferably about 900° C., for about 10 min to about 300 min, preferably about 60 min at 900° C. in low partial pressures of oxygen of about $10^{-17}$ to about $10^{-20}$ atm. The annealed Ni films typically have a RMS surface roughness of about 7.5 nm as measured by atomic force microscopy.

Before deposition of a thin film precursor solution onto a substrate such as Ni foil, the substrate is cleaned, such as by using deionized water, isopropyl alcohol and acetone (in an ultrasonic cleaner), to remove surface contaminates such as oils.

Formation of Blanket Thin Films by Chemical Solution Deposition

Blanket films of a dielectric or an electrode may be formed by spin casting a precursor solution thereof onto a substrate and then heat treating the deposited solution to form a thin film of the dielectric or electrode. Spin rate may vary but is typically about 3000 rpm for about 30 sec. Deposited films may be dried, pyrolyzed and fired using rapid thermal annealing until crystallization. The thickness of a blanket thin film layer of a precursor solution typically is about 20 nm to 200 nm dependent on the spin rate, as well as concentration and viscosity of the precursor solution employed. Multiple spin coatings may be used to achieve increased film thickness.

When a blanket thin film of stoichiometric $BaTiO_3$ is to be formed, stoichiometric $BaTiO_3$ precursor solution made as described above is spin coated onto a substrate such as 99.99% pure Ni foil at about 1000 RPM to about 4000 RPM. The $BaTiO_3$ precursor solution is dried at about 100° C. to about 200° C., preferably about 180° C. in air, and then pyrolyzed at about 250° C. to about 370° C., preferably about 360° C. for about 0.5 min to about 5 min, preferably about 3 min in air. The resulting pyrolyzed film is crystallized using rapid thermal annealing at about 650° C. to about 750° C., for about 0.5 min to about 5 min, preferably about 1 min in air, oxygen, or reducing atmosphere. This process may be repeated to build up large thicknesses of $BaTiO_3$. Alternatively, a plurality of films of precursor solutions may be deposited over each other prior to drying, pyrolyzing and firing to form a crystalline dielectric film of such as $BaTiO_3$. As a further alternative, suspensions of barium titanate may be substituted for the barium titanate precursor solutions.

When a blanket thin film of $LaNiO_3$ is to be formed, a $LaNiO_3$ precursor solution made as described above is spin coated onto the dielectric layer of such as $BaTiO_3$ at about 1000 RPM to about 4000 RPM. The $LaNiO_3$ precursor solution is dried at about 100° C. to about 200° C., preferably about 180° C. in air, and then pyrolyzed at about 200° C. to about 400° C., preferably about 380° C. for about 0.5 min to about 5 min, preferably about 3 min in air. The resulting pyrolyzed $LaNiO_3$ is crystallized using rapid thermal annealing at about 550° C. to about 850° C., preferably about 750° C. for about 0.5 min to about 5 min, preferably about 1 min in air. This process may be repeated to build up large thicknesses of $LaNiO_3$. Alternatively, a plurality of films of precursor solutions may be deposited over each other prior to drying, pyrolyzing and firing to form a crystalline electrode film of $LaNiO_3$. As a further alternative, suspensions of $LaNiO_3$ or other conducting particles may be substituted for the $LaNiO_3$ precursor solutions.

The dielectric permittivity of crystallized dielectric thin film may be increased by heat treatment. In the case of $BaTiO_3$ thin films, the film is heated to about 900° C. to about 1100° C., preferably about 1000° C. in oxygen partial pressures of about $10^{-16}$ to about $10^{-12}$ atmospheres, for about 1 min to about 240 min, preferably about 60 min. Following cooling the $BaTiO_3$ dielectric is heat treated at about 400° C. to about 800° C., preferably about 600° C. at about $10^{-6}$ to about $10^{-8}$ atm oxygen partial pressure for about 5 min to about 240 min, preferably about 30 min.

The invention is further illustrated below by reference to the following non-limiting examples.

Example 1

Formation of Blanket Thin Film of Stoichiometric $BaTiO_3$ on Ni Foil Substrates by Chemical Solution Deposition A Ba precursor solution is made by dissolving 0.01 mol of Ba acetate in 11.74 ml glacial acetic acid. The resulting solution is stirred for 1 hr at 90° C.

A Ti precursor solution is made by dissolving 0.01 mol of Ti isopropoxide in 2 ml of acetyl acetone.

A stoichiometric $BaTiO_3$ precursor solution is made by mixing the Ba precursor solution and the Ti precursor solution, and stirring for 1 hr at 90° C. Methanol is added to reduce the stoichiometric $BaTiO_3$ precursor solution molarity to 0.1 M.

The BaTiO$_3$ precursor solution is spin cast at 3000 RPM for 30 sec onto a 99.99% pure Ni foil substrate that is preannealed at 900° C. The film of BaTiO$_3$ precursor solution is dried at 180° C., pyrolyzed at 360° C. and crystallized by rapid thermal annealing at 750° C. This sequence of steps is repeated 8 times to produce a BaTiO$_3$ film thickness of 350 nm. The dielectric constant of the film is 1600 at room temperature and 1450 at 150° C. BaTiO$_3$ films heat treated at 1000° C. are fine-grained, as shown in FIG. 1.

Example 1.1

The procedure of example 1 is followed except that the sequence of steps is repeated six times to yield a BaTiO$_3$ film thickness of 265 nm. The dielectric constant of the film is 1750 at room temperature and 1600 at 150° C.

Example 1.2

The procedure of example 1 is followed except that the sequence of steps is repeated four times to yield a BaTiO$_3$ film thickness of 173 nm. The dielectric constant of the film is 1300 at room temperature and 1250 at 150° C.

Example 2

Formation of Blanket Thin Film of LaNiO$_3$ by Chemical Solution Deposition

A LaNiO$_3$ precursor solution made as described above adjusted to a molarity of 0.3M is used. The precursor solution is spin cast at 3000 RPM for 30 sec on to a Ni substrate. The film of LaNiO$_3$ precursor solution is dried at 180° C., pyrolyzed at 360° C. and crystallized by rapid thermal annealing at 650° C.

Example 2A

The procedure of example 2 is followed except that thermal annealing is done at 750° C.

Example 3

Formation of Blanket Thin Film of Ba(Ti$_{1-x}$Mn$_x$)O$_3$ by Chemical Solution Deposition where x=0.01

A Ba precursor solution made as in example 1 is employed. 0.01 Mole of the Ba precursor is mixed with 0.01× Mole Mn acetate and then combining with 11.74 ml glacial acetic acid to produce a Mn doped Ba precursor solution.

A Ti precursor solution is made by mixing 0.01(1-x) M Ti in 2 ml acetyl acetone and stirring until mixed.

The Ti solution and the Mn doped solutions are mixed at 90° C. for 45 minutes while rotating the flask at 500 rpm. The resulting Mn doped barium titanate precursor solution is spin cast on to a 99.99% pure Ni foil substrate that is preannealed at 900° C., dried, pyrolyzed, and crystallized using the same conditions as in Example 1.

Patterned Thin Films

In a further aspect, patterned thin films are produced by microcontact printing. Microcontact printing is performed using a micro stamp formed of polydimethylsiloxane stamp (PDMS). PDMS is prepared by mixing Part A (base) of Sylgard Silicone elastomer 184 and Part B (curing agent) of Sylgard Silicone elastomer 184 from Dow Corning to form a reaction mixture and subjecting the surface of the reaction mixture to a vacuum for 20 min to eliminate bubbles.

A micro stamp of PDMS is made by pouring the PDMS into a patterned Si mold. The surface feature height of the Si mold may vary over a wide range. Typically, the surface feature height is about 4 µm to about 10 µm. The micro stamp of PDMS is cured for >12 hours at 50° C. and peeled away from the Si mold. The micro stamp of PDMS may be treated with an oxygen plasma ashing step prior to use. Oxygen plasma ashing may be performed in a barrel asher, or other tool used for the removal of photoresist.

Any of electrode and dielectric precursor solutions, as well as suspensions of any of dielectric and electrode, may be deposited onto the micro stamp. A micro stamp containing, such as, a deposited precursor solution is spin cast to "doctor" the deposited solution to a desired thickness on the stamp. The micro stamp having the doctored precursor solution then is compressed onto a substrate to transfer a pattern of the precursor solution onto the substrate. Micro stamps which have the same or different patterns for each patterned layer of precursor solution of the dielectric and electrode may be employed. The micro stamps may be compressed onto a substrate in any suitable atmosphere such as air, inert gas and vacuum.

The deposited layer of patterned precursor solution is dried and additional patterned layers of dielectric or electrode precursor solution may be deposited over the previously deposited layer. In an alternative embodiment, a blanket layer may be deposited over a patterned layer. For example, dielectric may be deposited as a blanket film over a patterned electrode.

In one aspect, each patterned layer of dielectric precursor solution such as BaTiO$_3$ precursor solution is heat treated prior to deposition of an additional layer of dielectric precursor and/or electrode precursor solutions. In another aspect, a plurality of layers may be deposited without drying between successive deposited layers. Thus, a monolith of several layers of patterned precursor solutions of dielectric, electrode as well an alternating layers of dielectric and electrode may be deposited and heat treated to build a capacitor or varistor device of a desired configuration. The substrate on which the patterned solutions are formed may be removed or retained prior to thermal processing.

Example 4

Manufacture of Patterned Stoichiometric BaTiO$_3$ by Micro Contact Printing

BaTiO$_3$ precursor solution is made as in example 1. The solution is deposited onto a PDMS micro stamp and spin cast at 3000 RPM for 30 sec. The stamp then is compressed onto a SiO$_2$/Si substrate. The patterned film of BaTiO$_3$ precursor solution is dried at 150° C., pyrolyzed at 350° C. and crystallized by rapid thermal annealing at 750° C. The film has a thickness of 40 nm for a 0.1 M solution and a line edge roughness of 1 mm.

Example 4A

The procedure of example 4 is followed except that molarity of the BaTiO$_3$ precursor solution is diluted to 0.68M. The thickness of the film is 245 nm.

Example 4B

The procedure of example 4 is employed except that the Ni foil substrate of example 1 is substituted for the SiO$_2$/Si substrate.

Example 4C

The procedure of example 4 is employed except that alumina is substituted for the SiO$_2$/Si substrate.

Example 4C

The procedure of example 4 is employed except that cordierite is substituted for the SiO$_2$/Si substrate.

Example 5

Manufacture of Patterned Ba(Ti$_{1-x}$Mn$_x$)O$_3$ where x=0.01 by Micro Contact Printing

The procedure of example 4 is employed except that the precursor solution of example 3 employed to form Ba(Ti$_{1-x}$Mn$_x$)O$_3$ where x=0.01 is substituted for the BaTiO$_3$ precursor solution employed in example 4.

Example 5A

The procedure of example 5 is employed except that the Ni foil substrate of example 1 is substituted for the SiO$_2$/Si substrate employed in example 4.

Example 5B

The procedure of example 5A is employed except that alumina is substituted for the Ni foil substrate.

Example 5C

The procedure of example 5A is employed except that cordierite is substituted for the Ni foil substrate.

Example 5D

The procedure of example 5A is employed except that Cu foil is substituted for the Ni foil substrate.

Example 5E

The procedure of example 5A is employed except that Pt foil is substituted for the Ni foil substrate.

Example 6

Manufacture of Patterned LaNiO$_3$ by Micro Contact Printing

The LaNiO$_3$ precursor solution employed in Example 2 is used. The solution is deposited onto a PDMS micro stamp and spin cast at 3000 RPM for 30 sec. The stamp then is compressed onto a SiO$_2$/Si substrate. The patterned film of precursor is dried at 150° C., pyrolyzed at 360° C. and crystallized by rapid thermal annealing at 750° C. The film has a thickness of 40 nm and a line edge roughness of 1 mm.

Example 6A

The procedure of example 6 is employed except that the Ni foil substrate of example 1 is substituted for the SiO$_2$/Si substrate.

Example 6B

The procedure of example 6A is employed except that alumina is substituted for the Ni foil substrate.

Example 6C

The procedure of example 6A is employed except that cordierite is substituted for the Ni foil substrate.

Example 6D

The procedure of example 6A is employed except that Cu foil is substituted for the Ni foil substrate.

Example 6E

The procedure of example 6A is employed except that Pt foil is substituted for the Ni foil substrate.

Manufacture of Multilayer Capacitors by Blanket Thin Films Formed by Chemical Solution Deposition

Using the procedure employed above for deposition of blanket thin films by chemical solution deposition, blanket thin films of BaTiO$_3$ and LaNiO$_3$ are deposited onto a substrate to produce a multilayer capacitor.

Example 7

Manufacture of LaNiO$_3$/BaTiO$_3$/LaNiO$_3$ Multilayer Capacitor by Chemical Solution Deposition

Precursor solutions of 0.1 M BaTiO$_3$ and 0.3M LaNiO$_3$ made as described above are used. The BaTiO$_3$ precursor solution is deposited onto a sapphire single crystal and spin cast at 3000 RPM for 30 sec. The BaTiO$_3$ precursor layers are then dried at 180° C. for 3 min to remove solvent, pyrolyzed at 260° C. for 3 min. and crystallized at 750° C. for 1 min in O$_2$. An additional layer of BaTiO$_3$ precursor solution is spin cast over the previously deposited BaTiO$_3$ layer and the heat treatment is repeated.

The LaNiO$_3$ precursor solution then is deposited onto the crystallized film of BaTiO$_3$ and spin cast at 3000 RPM for 30 sec. The deposited LaNiO$_3$ film is heated on a hot plate at 180° C. for 3 min to remove solvent, pyrolyzed at 260° C. for 3 min., and crystallized by rapid thermal annealing at 650° C. for 1 minute in O$_2$.

Figure 2:
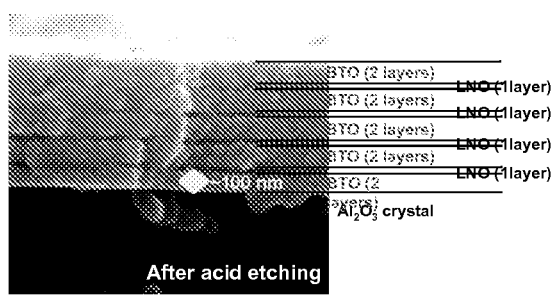
FIG. 2 shows a multilayer capacitor formed of blanket thin films of $BaTiO_3$ and $LaNiO_3$

A set of two layers of BaTiO$_3$ precursor using the procedure above then is deposited onto the crystallized LaNiO$_3$ layer and spin cast at 3000 RPM for 30 sec. The solvent is removed by heating to 180° C. for 3 min and pyrolyzed at 260° C. for 3 min. The BaTiO$_3$ layer is crystallized at 750° C. for 1 minute in O$_2$. This process is repeated four times to produce a monolithic multilayer capacitor stack of five BaTiO$_3$ films of 100 nm thickness alternating with four LaNiO$_3$ films of <50 nm thickness as shown in FIG. 2.

The monolith multilayer capacitor is fractured and etched with hydrochloric acid to enable the individual layers of the capacitor to be identified. The monolith multilayer capacitor did not exhibit delamination or cracking. Also, the LaNiO$_3$ electrode layers remained coherent to thicknesses less than 100 nm.

Example 7A

The procedure of example 7 is employed except that the Ni foil substrate of example 1 is substituted for the sapphire single crystal substrate.

Example 7B

The procedure of example 7A is employed except that alumina is substituted for the Ni foil substrate.

Example 7C

The procedure of example 7A is employed except that cordierite is substituted for the Ni foil substrate.

Example 7D

The procedure of example 7A is employed except that Cu foil is substituted for the Ni foil substrate.

Example 7E

The procedure of example 7A is employed except that Pt foil is substituted for the Ni foil substrate.

Manufacture of Multilayer Capacitors which have Patterned Dielectric And/or Electrode Layers by Microcontact Printing

Example 8

Manufacture of $LaNiO_3/BaTiO_3/LaNiO_3$ Multilayer Capacitors by Microcontact Printing A 0.3 M 2-methoxyethanol based $LaNiO_3$ precursor solution made as described above is spin coated onto a PDMS micro stamp at 3000 rpm for 30 sec. The coated micro stamp is compressed onto a $SiO_2/Si$ substrate to produce a patterned layer of the $LaNiO_3$ precursor solution. The layer of $LaNiO_3$ precursor solution is dried at 150° C. for 3 min in air, pyrolyzed at 360° C. for 3 min in air and crystallized at 750° C. for 1 min. by rapid thermal annealing in a $N_2$ atmosphere to achieve a $LaNiO_3$ layer of 40 nm thickness.

A 0.1 M $BaTiO_3$ precursor solution made as described above is then spin coated onto a second PDMS stamp at 3000 rpm for 30 sec. The coated micro stamp is aligned with respect to the first pattern of $LaNiO_3$ and then compressed onto the $LaNiO_3$ pattern to form a patterned layer of $BaTiO_3$ precursor on the $LaNiO_3$ pattern. The thickness of the $BaTiO_3$ precursor layer is 60 nm. The film of $BaTiO_3$ precursor solution is dried at 150° C., pyrolyzed at 350° C. and crystallized by rapid thermal annealing at 750° C.

A second layer of the above $LaNiO_3$ precursor solution is microcontact printed over the patterned layer of $BaTiO_3$ precursor solution using the procedure employed with the first layer of $LaNiO_3$. The second $LaNiO_3$ layer is heat treated according to the procedure used for the first layer. The thickness of the second $LaNiO_3$ film produced is 40 nm.

Figure 3:
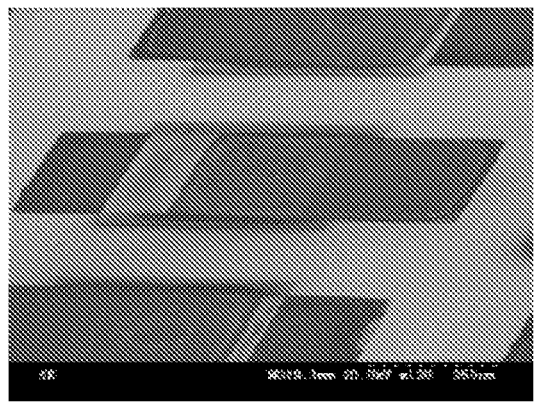
FIG. 3 shows a SEM image of an array of microcontact printed single layer thin film capacitors that show alignment of layers.
Figure 4:
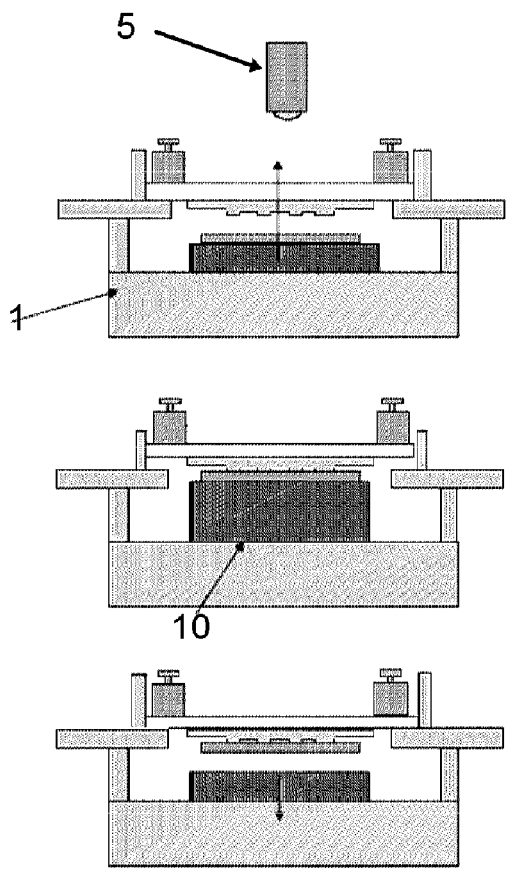
FIG. 4 shows a fixture used to align successive layers of patterned solutions.

Successive patterned layers of such as $LaNiO_3$ and $BaTiO_3$ are optically aligned in a transmission mode to about 1 micron precision using the alignment fixture 1 shown in FIG. 4. Alignment fixture 1 includes optical microscope 5 with separate movable stages 10 of a Cascade microprobe station for each of the PDMS stamp and the substrate in each of X, Y and Z directions. As shown in FIG. 3, each layer is clearly patterned, and alignment between successive printings is achieved.

Figure 5:
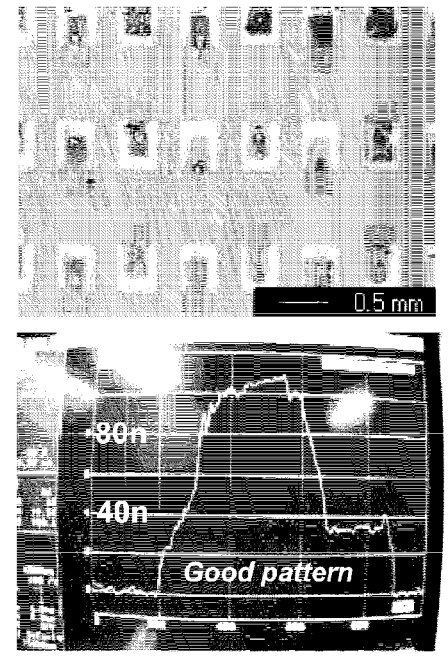
FIG. 5 shows thickness profile of a $LaNiO_3/BaTiO_3/LaNiO_3$ capacitor made by micro-contact printing on a $SiO_2/Si$ substrate.
Figure 6:
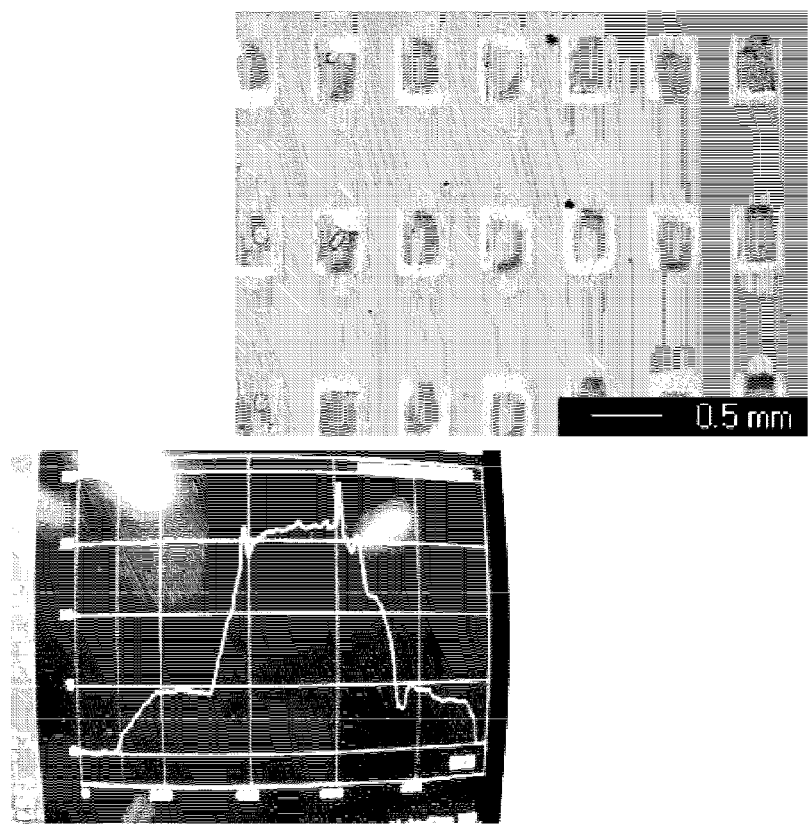
FIG. 6 shows thickness profile of a $LaNiO_3/BaTiO_3/LaNiO_3$ capacitor made by micro-contact printing on a $SiO_2/Si$ substrate.
Figure 7:
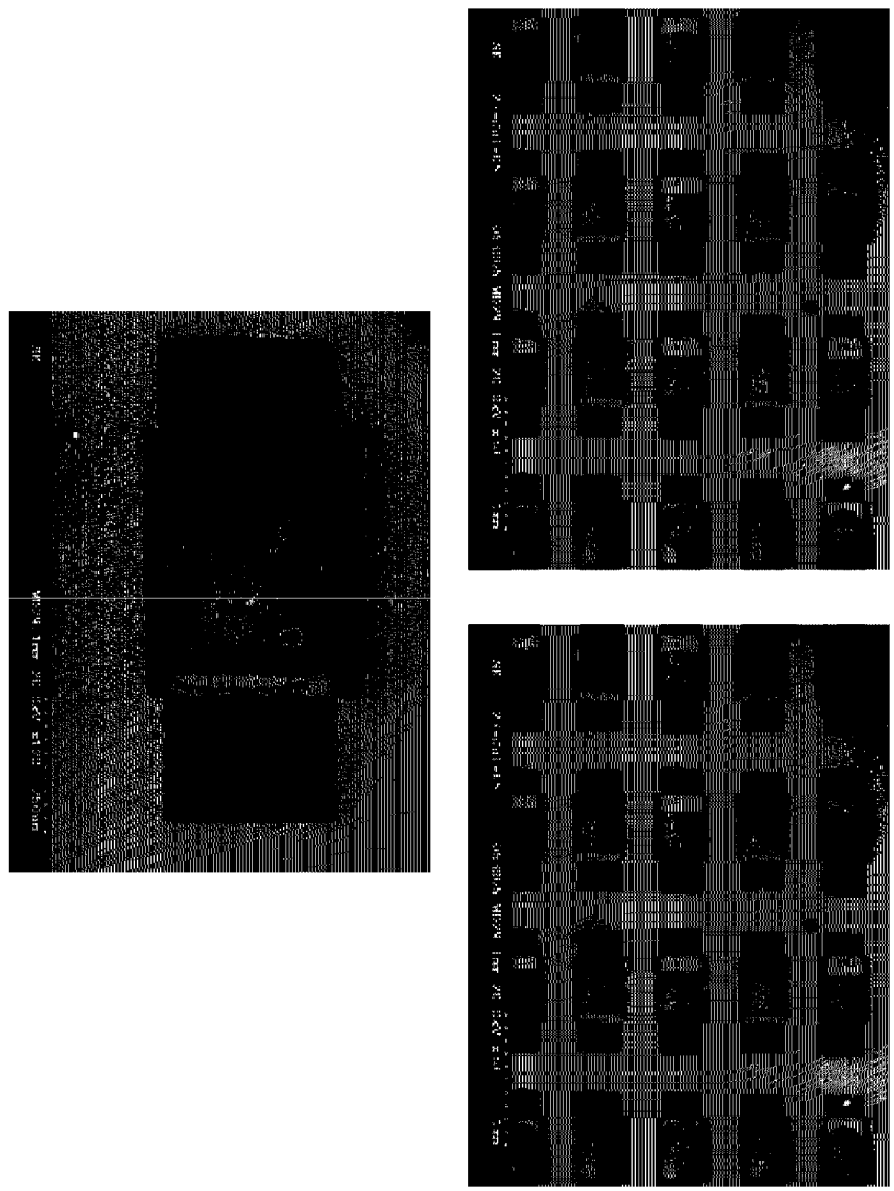
FIG. 7 shows a scanning electron microscope image of micro-contact printed $LaNiO_3/BaTiO_3/LaNiO_3$ capacitors made on a $SiO_2/Si$ substrate.

FIGS. 5 and 6 show thickness profiles of the $LaNiO_3/BaTiO_3/LaNiO_3$ capacitor made by micro-contact printing on a $SiO_2/Si$ substrate, and FIG. 7 shows a scanning electron microscope image of micro-contact printed $LaNiO_3/BaTiO_3/LaNiO_3$ capacitors made on a $SiO_2/Si$ substrate.

Example 8A

Manufacture of $LaNiO_3/BaTiO_3/LaNiO_3$ Multilayer Capacitors by Microcontact Printing The procedure of example 8 is followed except that the $Ba(Ti_{1-x}Mn_x)O_3$ where x=0.01 precursor solution of example 3 is substituted for the $BaTiO_3$ precursor solution.

Example 8B

The procedure of example 8 is employed except that the Ni foil substrate of example 1 is substituted for the $SiO_2/Si$ substrate.

Example 8C

The procedure of example 8B is employed except that alumina is substituted for the Ni foil substrate.

Example 8D

The procedure of example 8B is employed except that cordierite is substituted for the Ni foil substrate.

Example 8E

The procedure of example 8B is employed except that Cu foil is substituted for the Ni foil substrate.

Example 8F

The procedure of example 8B is employed except that Pt foil is substituted for the Ni foil substrate.

Example 9

Manufacture of Multilayer Capacitor with Films Deposited by Chemical Solution Deposition and by Microcontact Printing The 2-methoxyethanol based $LaNiO_3$ precursor solution employed in example 8 is spin coated onto a PDMS micro stamp at 3000 rpm for 30 sec. The coated micro stamp is compressed onto a $SiO_2/Si$ substrate to produce a patterned layer of the $LaNiO_3$ precursor solution. The layer of $LaNiO_3$ precursor solution is dried at 150° C. for 3 min in air, pyrolyzed at 360° C. for 3 min in air and crystallized at 750° C. for 1 min. by rapid thermal annealing in air.

A stoichiometric $BaTiO_3$ precursor solution made as described above is spin cast at 3000 RPM for 10 sec onto the patterned layer of $LaNiO_3$. The blanket film of $BaTiO_3$ precursor solution is dried at 150° C., pyrolyzed at 360° C. and crystallized by rapid thermal annealing at 750° C.

A second layer of the above $LaNiO_3$ precursor solution is microcontact printed over the layer of $BaTiO_3$ precursor solution using the procedure employed with the first layer of $LaNiO_3$. The second $LaNiO_3$ layer is heat treated according to the procedure used for the first layer of $LaNiO_3$.

Example 9A

The procedure of example 9 is employed except that the Ni foil substrate of example 1 is substituted for the $SiO_2/Si$ substrate.

Example 9B

The procedure of example 9A is employed except that alumina is substituted for the Ni foil substrate.

Example 9C

The procedure of example 9A is employed except that cordierite is substituted for the Ni foil substrate.

Example 9D

The procedure of example 9A is employed except that Cu foil is substituted for the Ni foil substrate.

Example 9E

The procedure of example 9A is employed except that Pt foil is substituted for the Ni foil substrate.

Example 9F

The procedure of example 9 is employed except that $Ba(Ti_{1-x}Mn_x)O_3$ where x=0.01 precursor solution of example 3 is substituted for the $BaTiO_3$ precursor solution.

Example 9G

The procedure of example 9F is employed except that the Ni foil substrate of example 1 is substituted for the $SiO_2$/Si substrate.

Example 9H

The procedure of example 9G is employed except that alumina is substituted for the Ni foil substrate.

Example 9I

The procedure of example 9G is employed except that cordierite is substituted for the Ni foil substrate.

Example 9J

The procedure of example 9G is employed except that Cu foil is substituted for the Ni foil substrate.

Example 9K

The procedure of example 9G is employed except that Pt foil is substituted for the Ni foil substrate.

The invention may be used to produce patterned thin films of, such as, stoichiometric $BaTiO_3$ for use in a variety of multilayer capacitors and other devices. Examples of such devices include but are not limited to standard multilayer capacitors such as surface mount or embedded configuration capacitors; reverse termination multilayer capacitors such as surface mount or embedded configuration capacitors; floating, trim or same side termination electrode multilayer capacitors such as for reduced ESR, greater capacitance precision or high voltage devices; interdigitated multilayer capacitors; adjustable ESR configuration capacitors such as those which have a designed resistivity material as electrode; array multilayer capacitors such as surface mount or embedded capacitors; EMI C filters such as surface mount, embedded, panel mount or connector filters; EMI L, pi, T or multi-element filters such as cofired with an inductor material, surface mount, embedded, panel mount or connector filters; discoidal multilayer configuration capacitor such as panel mount or connector tubular capacitor devices such as leaded devices; rolled foil capacitors such as those similar to film or aluminum electrolytic configuration; embedded capacitor configurations such as embedded CLR or CL or CR device or the like and silicon capacitor devices.

What is claimed is:

1. A method of forming a microcontact printed layer of stoichiometric barium titanate on a Ni foil substrate comprising,
    reacting a Ba precursor solution with a Ti precursor solution to produce a precursor solution suitable for producing stoichiometric barium titanate,
    applying the precursor solution onto a stamp that has a predetermined pattern thereon to form a coated stamp,
    compressing the coated stamp onto a Ni foil substrate to form a pattern of the precursor solution on the Ni foil substrate,
    drying the pattern,
    pyrolyzing the pattern and
    firing the pattern to produce a micro contact printed layer of stoichiometric barium titanate on the Ni foil substrate.

2. The method of claim 1 wherein the Ni foil substrate is any of annealed Ni foil, virgin Ni foil and 99.99% pure Ni foil.

3. A method of manufacture of a multilayer capacitor by microcontact printing comprising,
    forming a precursor solution of an electrode,
    applying the precursor solution of the electrode onto a stamp having a predetermined pattern to form a coated stamp,
    compressing the coated stamp onto a $SiO_2$/Si substrate to form a pattern of the precursor solution of the electrode on the substrate,
    heat treating the precursor solution of the electrode to produce a crystallized layer of patterned electrode on the substrate,
    forming a precursor solution of a dielectric material,
    applying the precursor solution of the dielectric material onto a stamp having a predetermined pattern to form a dielectric precursor material coated stamp,
    compressing the dielectric precursor material coated stamp onto the patterned electrode to form a pattern of the dielectric precursor solution on the patterned electrode,
    applying the precursor solution of the electrode onto a stamp having a predetermined pattern to form a coated stamp,
    compressing the coated stamp onto the patterned precursor solution of dielectric to form a multilayer monolith, and
    heat treating the monolith to produce multilayer capacitor.

4. The method of claim 3 wherein the electrode is $LaNiO_3$ and the dielectric is $BaTiO_3$.

5. The method of claim 3 wherein the electrode is $LaNiO_3$ and the dielectric is $Ba(Ti_{1-x}M_x)O_3$ where M is any of Mn, Y, Ho, Dy, Er, Mg, Ca, Co, Sr, Zr or mixtures thereof.

6. A method of manufacture of a multilayer capacitor comprising,
    forming a precursor solution of a dielectric material,
        applying the precursor solution of the dielectric on to a sapphire single crystal substrate and spin casting the substrate having the precursor solution of dielectric thereon,
        heat treating the precursor solution to produce crystallized dielectric,
    forming a precursor solution of an electrode material,
    applying the precursor solution of electrode material onto the crystallized dielectric and spin casting, heat treating the precursor solution of electrode material to produce a layer of crystallized electrode material on the crystallized layer of dielectric material, applying the precursor solution of the dielectric on to the crystallized electrode material and spin casting, and heat treating to produce a multilayer capacitor.

7. The method of claim 6 wherein the electrode is $LaNiO_3$ and the dielectric is $BaTiO_3$.

8. The method of claim 6 wherein the electrode is $LaNiO_3$ and the dielectric is $Ba(Ti_{1-x}M_x)O_3$ where M is any of Mn, Y, Ho, Dy, Er, Mg, Ca, Co, Sr, Zr or mixtures thereof.

9. A method of manufacture of a multilayer capacitor comprising, forming a precursor solution of a dielectric material, applying the precursor solution of the dielectric on to a Ni foil substrate and spin casting the substrate having the precursor solution of dielectric thereon, heat treating the precursor solution to produce crystallized dielectric, forming a precursor solution of an electrode material, applying the precursor solution of electrode material onto the crystallized dielectric and spin casting, heat treating the precursor solution of electrode material to produce a layer of crystallized electrode material on the crystallized layer of dielectric material, applying the precursor solution of the dielectric on to the crystallized electrode material and spin casting, and heat treating to produce a multilayer capacitor.

10. The method of claim 9 wherein the electrode is $LaNiO_3$ and the dielectric is $BaTiO_3$.

11. The method of claim 9 wherein the electrode is $LaNiO_3$ and the dielectric is $Ba(Ti_{1-x}M_x)O_3$ where M is any of Mn, Y, Ho, Dy, Er, Mg, Ca, Co, Sr, Zr or mixtures thereof.

12. A method of manufacture of a multilayer capacitor comprising, forming a precursor solution of an electrode material, applying the precursor solution of the electrode material on to a stamp to form a stamp coated with the precursor solution of electrode, compressing the coated stamp onto a $SiO_2$/Si substrate to produce a patterned layer of electrode precursor solution, heat treating the electrode precursor solution to produce a patterned electrode, forming a precursor solution of dielectric and spin casting the precursor solution of dielectric onto the patterned electrode, heat treating the precursor solution of dielectric to produce crystallized dielectric, applying a layer of the precursor solution of electrode on to a second stamp to form a stamp coated with the precursor solution of electrode material, compressing the second stamp coated with the precursor solution of electrode material onto the crystallized dielectric to form a patterned layer of electrode precursor solution on the crystallized dielectric, and heat treating to produce a multilayer capacitor.

13. The method of claim 12 wherein the electrode is $LaNiO_3$ and the dielectric is $BaTiO_3$.

14. The method of claim 12 wherein the electrode is $LaNiO_3$ and the dielectric is $Ba(Ti_{1-x}Mn_x)O_3$ where x=0.01.

15. A method of manufacture of a multilayer capacitor comprising, forming a precursor solution of an electrode material, applying the precursor solution of the electrode material on to a stamp to form a stamp coated with the precursor solution of electrode, compressing the coated stamp onto a Ni foil substrate to produce a patterned layer of electrode precursor solution, heat treating the electrode precursor solution to produce a patterned electrode, forming a precursor solution of dielectric and spin casting the precursor solution of dielectric onto the patterned electrode, heat treating the precursor solution of dielectric to produce crystallized dielectric, applying a layer of the precursor solution of electrode on to a second stamp to form a stamp coated with the precursor solution of electrode material, compressing the second stamp coated with the precursor solution of electrode material onto the crystallized dielectric to form a patterned layer of electrode precursor solution on the crystallized dielectric, and heat treating to produce a multilayer capacitor.

16. The method of claim 15 wherein the electrode is $LaNiO_3$ and the dielectric is $BaTiO_3$.

17. The method of claim 15 wherein the electrode is $LaNiO_3$ and the dielectric is $Ba(Ti_{1-x}Mn_x)O_3$ where x=0.01.

18. A method of forming a microcontact printed layer of $Ba(Ti_{1-x}M_x)O_3$ where M is a dopant thereof on to a substrate comprising, forming an M precursor solution where M is any of Mn, Y, Ho, Dy, Er, Mg, Ca, Co or mixtures thereof, forming a Ba precursor solution, mixing the M precursor solution with the Ba precursor solution to produce a blended solution, reacting the blended solution with a Ti precursor solution to produce a $Ba(Ti_{1-x}M_x)O_3$ precursor solution where $0.005 \leq x \leq 0.02$, applying the $Ba(Ti_{1-x}M_x)O_3$ precursor solution onto a stamp that has a predetermined pattern thereon to form a coated stamp, compressing the coated stamp onto a substrate selected from the group consisting of Cu foil, alumina, cordierite, cordierite containing glass-ceramics alumina containing glass-ceramics, and $Si/SiO_2$ to form a pattern of the $Ba(Ti_{1-x}M_x)O_3$ precursor solution on the substrate, drying the pattern, pyrolyzing the pattern and firing the pattern to produce a micro contact printed layer of $Ba(Ti_{1-x}M_x)O_3$ on the substrate.

19. A method of manufacture of a multilayer capacitor by microcontact printing comprising, forming a precursor solution of an electrode, applying the precursor solution of the electrode onto a stamp having a predetermined pattern to form a coated stamp, compressing the coated stamp onto a substrate selected from the group consisting of Cu foil, alumina, cordierite, cordierite containing glass-ceramics alumina containing glass-ceramics, and $Si/SiO_2$ to form a pattern of the precursor solution of the electrode on the substrate, heat treating the precursor solution of the electrode to produce a crystallized layer of patterned electrode on the substrate, forming a precursor solution of a dielectric material, applying the precursor solution of the electrode onto a stamp having a predetermined pattern to form a dielectric precursor material coated stamp, compressing the dielectric precursor material coated stamp onto the patterned electrode to form a pattern of the dielectric precursor solution on the patterned electrode wherein the dielectric precursor material is a precursor for stoichiometric barium titanate, applying the precursor solution of the electrode onto a stamp having a predetermined pattern to form a coated stamp, compressing the coated stamp onto the patterned precursor solution of dielectric to form a multilayer monolith comprising a precursor solution of dielectric on crystallized electrode and precursor solution of electrode on the precursor solution of the dielectric, and heat treating the monolith to produce a multilayer capacitor.

20. A method of manufacture of a multilayer capacitor comprising, forming a precursor solution of a dielectric material for stoichiometric barium titanate, applying the precursor solution of the dielectric on to a substrate selected from the group consisting of Cu foil, alumina, cordierite, cordierite containing glass-ceramics alumina containing glass-ceramics, and $Si/SiO_2$ and spin casting the substrate having the precursor solution of dielectric thereon, heat treating the precursor solution to produce crystallized dielectric, forming a precursor solution of an electrode material, applying the precursor solution of electrode material onto the crystallized dielectric and spin casting, heat treating the precursor solution of electrode material to produce a layer of crystallized electrode material on the crystallized layer of dielectric material, applying the precursor solution of the dielectric on to the substrate and spin casting, and heat treating to produce a multilayer capacitor.

21. A method of manufacture of a multilayer capacitor comprising, forming a precursor solution of a dielectric material wherein the dielectric precursor material is a precursor for stoichiometric barium titanate, applying the precursor solution of the dielectric on to a substrate selected from the group consisting of Cu foil, alumina, cordierite, cordierite containing glass-ceramics alumina containing glass-ceramics, and $Si/SiO_2$ and spin casting the substrate having the precursor solution of dielectric thereon, heat treating the precursor solution to produce crystallized dielectric, forming a precursor solution of an electrode material, applying the precursor solution of electrode material onto the crystallized dielectric and spin casting, heat treating the precursor solution of electrode material to produce a layer of crystallized electrode material on the crystallized layer of dielectric material, applying the precursor solution of the dielectric on to the crystallized electrode material and spin casting, and heat treating to produce a multilayer capacitor.

* * * * *